(12) United States Patent
Kao

(10) Patent No.: US 6,486,446 B1
(45) Date of Patent: Nov. 26, 2002

(54) COMBINATION OF A BOTTOM OF A PAN AND A HEATING MEANS

(76) Inventor: Yao-Tsung Kao, No. 9, Lane 37, An Chung Road, Tainan City (TW)

( * ) Notice: Subject to any disclaimer, the term of this patent is extended or adjusted under 35 U.S.C. 154(b) by 0 days.

(21) Appl. No.: 09/977,177

(22) Filed: Oct. 15, 2001

(51) Int. Cl.[7] .................... A47J 27/022; F27B 11/02; H05B 3/02
(52) U.S. Cl. .................... 219/438; 219/441; 219/439
(58) Field of Search ..................... 219/439, 430, 219/435, 438, 441, 442, 530, 536, 540, 542

(56) References Cited

U.S. PATENT DOCUMENTS

| | | | | |
|---|---|---|---|---|
| 3,798,415 A | * | 3/1974 | Graham | 219/441 |
| 3,908,111 A | * | 9/1975 | Bois et al. | 219/442 |
| 3,934,118 A | * | 1/1976 | Jorgenson et al. | 219/442 |
| 4,115,918 A | * | 9/1978 | Anderl et al. | 29/611 |
| 4,268,741 A | * | 5/1981 | O'Brien | 219/430 |
| 6,080,968 A | * | 6/2000 | Taylor | 219/441 |
| 6,114,667 A | * | 9/2000 | Balandier et al. | 219/438 |
| 6,153,859 A | * | 11/2000 | Taylor et al. | 219/441 |

* cited by examiner

*Primary Examiner*—Joseph Pelham
(74) *Attorney, Agent, or Firm*—Charles E. Baxley

(57) ABSTRACT

A combination of a bottom of a pan and a heating device comprises a pan, an aluminum alloy plate and an electric heating member welded to a bottom of the pan by means of instantaneous welding, a thermostatic circuit fixed to the bottom of the pan for keeping the pan at a constant temperature when energized, a mounting plate integrally formed with the aluminum alloy plate, and a temperature-control switch fixed to the mounting plate. A switch is mounted to a rear of the temperature-control switch to thereby switch the temperature-control switch between the electric heating member and the thermostatic circuit. An activating member is operably connected to the switch in a manner that the electric heating member is turned on when the activating member is manually activated and that the electric heating member is turned off and the thermostatic circuit is energized when a food in the pan is well cooked or heated to a predetermined temperature.

3 Claims, 5 Drawing Sheets

COMBINATION OF A BOTTOM OF A PAN AND A HEATING MEANS

BACKGROUND OF THE INVENTION

1. Field of the Invention

The present invention relates to a combination of a bottom of a pan and a heating means.

2. Description of the Related Art

FIG. 5 of the drawings illustrates a conventional electric rice cooker comprising an inner pan 1' that is generally formed by means of aluminum extrusion. A thermo-sensitive plate 2', an electric heating member 3', and a thermostatic circuit 4' are mounted to a bottom of the inner pan 1'. When in use, the thermo-sensitive plate 2' is deformed when it is heated and thus switches the power supply circuit from the electric heating member 3' to the thermostatic circuit 4'. When cooking is required, a lever 5' is pushed to move the thermo-sensitive plate 2' to connect with the electric heating member 3', thereby proceeding with cooking of rice in the inner pan 1'. However, cooking in the aluminum inner pan 1' is apt to produce toxic substances. The assembly procedure is troublesome and the overall cost is relatively high, as there are many complicated elements in the heat-sensing mechanism. In addition, the electric heating member is not integrally formed with the bottom of the inner pan and thus could not provide uniform heat conduction.

SUMMARY OF THE INVENTION

An object of the present invention is to provide a combination of a bottom of a pan and a heating means. The combination comprises a pan, an aluminum alloy plate and an electric heating member welded to a bottom of the pan by means of instantaneous welding, a thermostatic circuit fixed to the bottom of the pan for keeping the pan at a constant temperature when energized, a mounting plate integrally formed with the aluminum alloy plate, and a temperature-control switch fixed to the mounting plate. A switch is mounted to a rear of the temperature-control switch to thereby switch the temperature-control switch between the electric heating member and the thermostatic circuit. An activating member is operably connected to the switch in a manner that the electric heating member is turned on when the activating member is manually activated and that the electric heating member is turned off and the thermostatic circuit is energized when a food in the pan is well cooked or heated to a predetermined temperature.

In an embodiment of the invention, the mounting plate extends along a horizontal plane, and the activating member is a push button. In another embodiment of the invention, the mounting plate extends along a plane orthogonal to the bottom of the pan, and the activating member is a lever.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
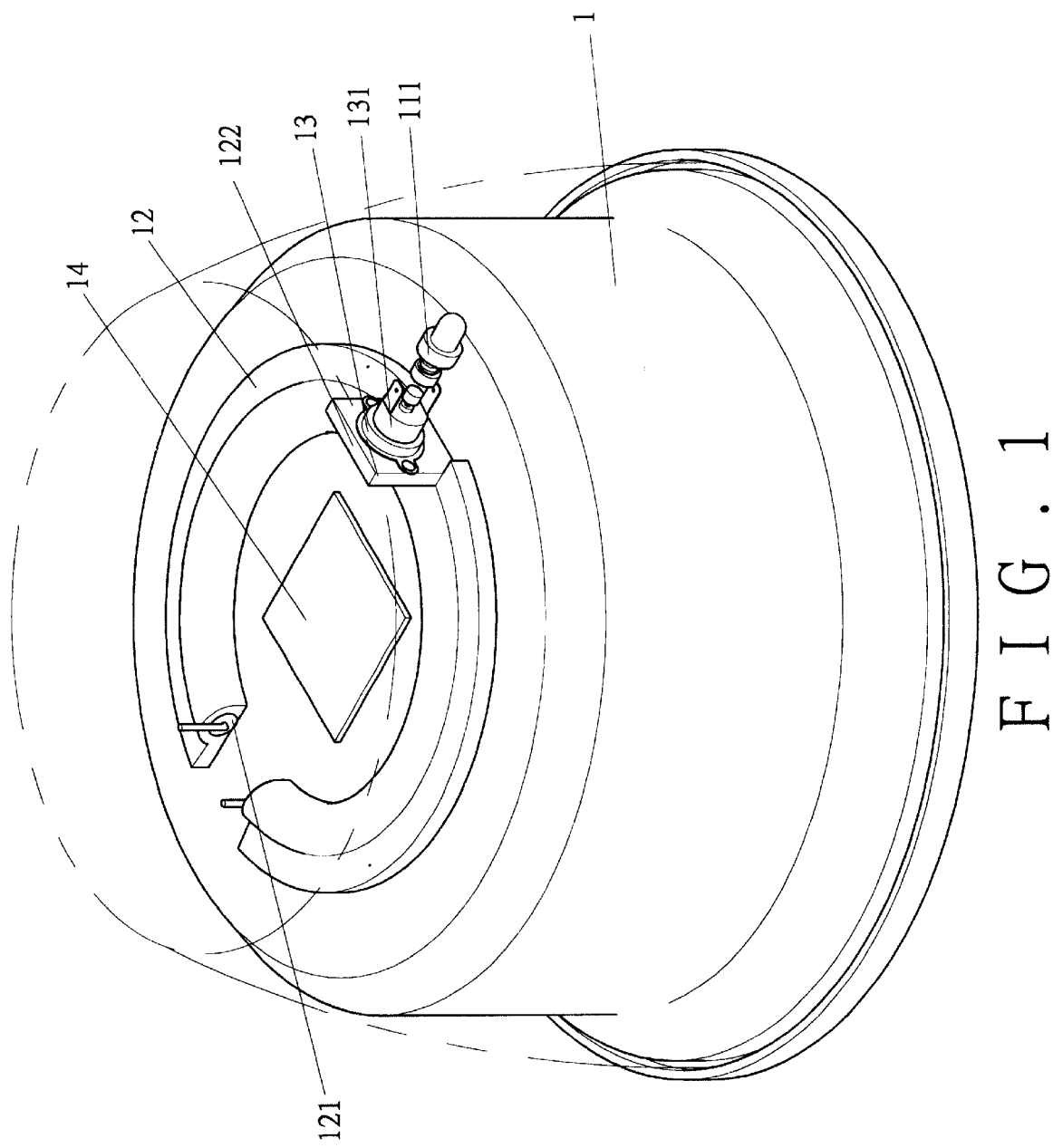
FIG. 1 is a bottom perspective view of a first embodiment of a combination of a bottom of a pan and a heating means in accordance with the present invention.
Figure 3:
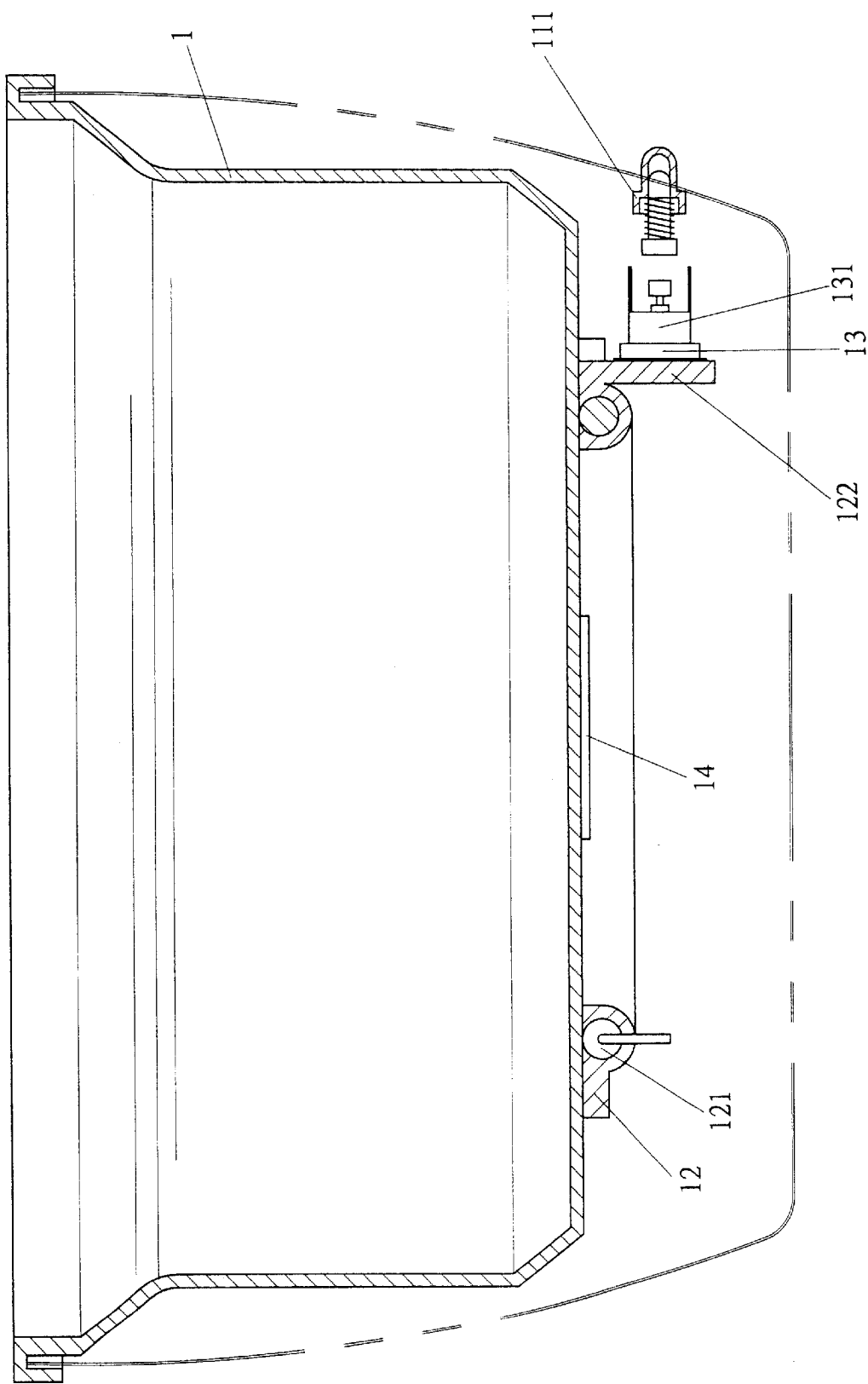
FIG. 3 is a sectional view of the combination in FIG. 1.

Referring to FIGS. 1 and 3, a combination of a bottom of a pan and a heating means in accordance with the present invention generally comprises a pan 1, an aluminum alloy plate 12, a temperature-control switch 13, and a thermostatic circuit 14.

The aluminum alloy plate 12 and an electric heating member 121 are welded to a bottom of the pan 1 by means of instantaneous welding. The pan 1 is made of material the same as or other than that of the aluminum alloy plate 12. A mounting plate 122 is integrally formed with a periphery of the aluminum alloy plate 12. The temperature-control plate 122 is welded to the bottom of the pan 1 and extends in a plane orthogonal to the bottom of the pan 1. In addition, the temperature-control switch 13 is fixed to the mounting plate 122. A switch 131 is mounted to a rear of the temperature-control switch 13 to control switching between the electric heating member 121 and the thermostatic circuit 14.

An activating member 111 can be used to activate the switch 131 to initiate heating of the electric heating member 121, thereby heating the pan 1 for cooking purpose. In the embodiment shown in FIGS. 1 and 3, the activating member 111 is a push button that can be manually pushed to activate the switch 131 to thereby initiate the cooking procedure. When the temperature-control switch 13 reaches a predetermined temperature or the food in the pan 1 has been well cooked, the temperature-control switch 13 turns off the electric heating member 121 and energizes the thermostatic circuit 14 to provide a temperature-keeping effect.

Figure 2:
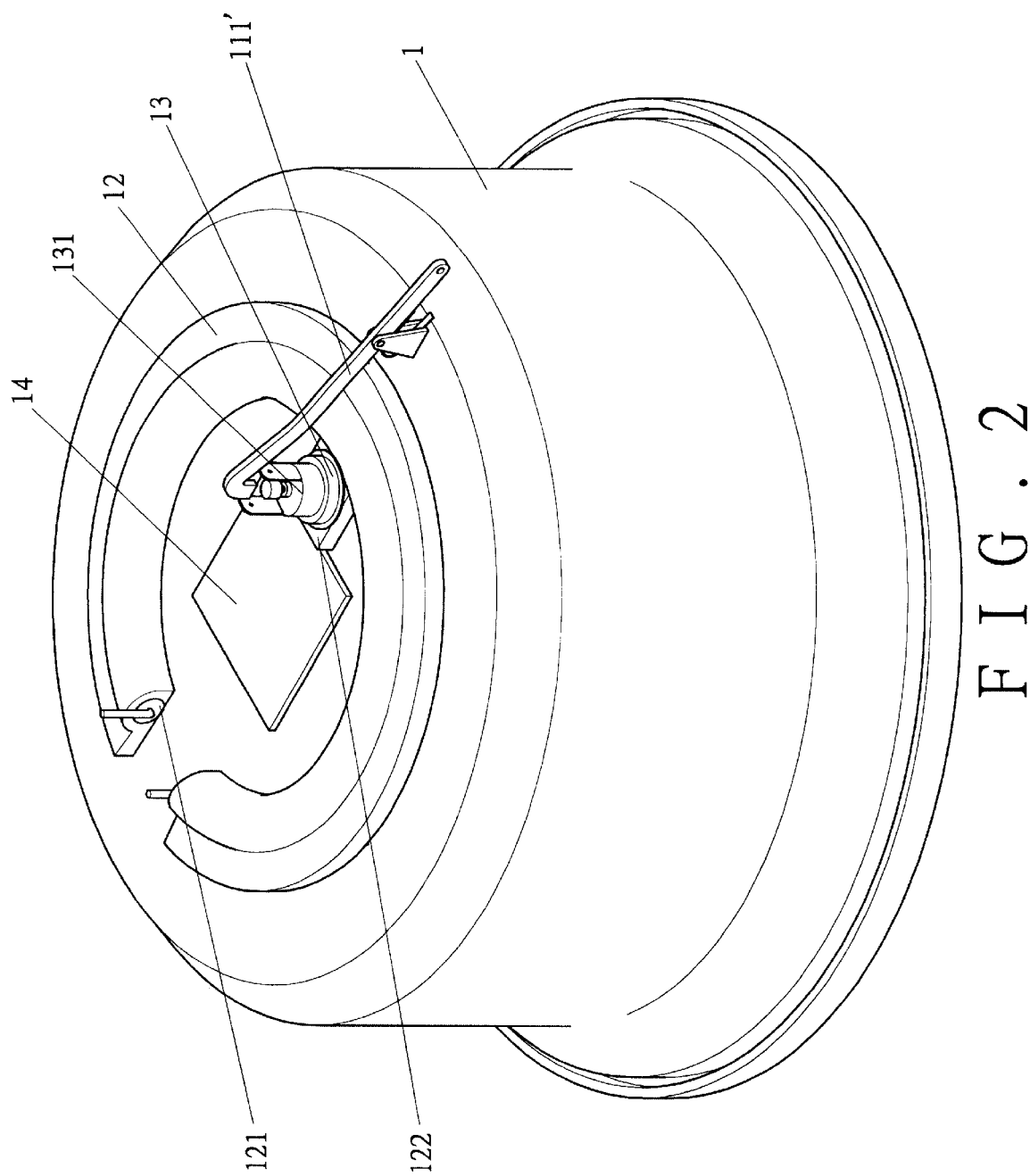
FIG. 2 is a perspective view of a second embodiment of a combination of a bottom of a pan and a heating means in accordance with the present invention.
Figure 4:
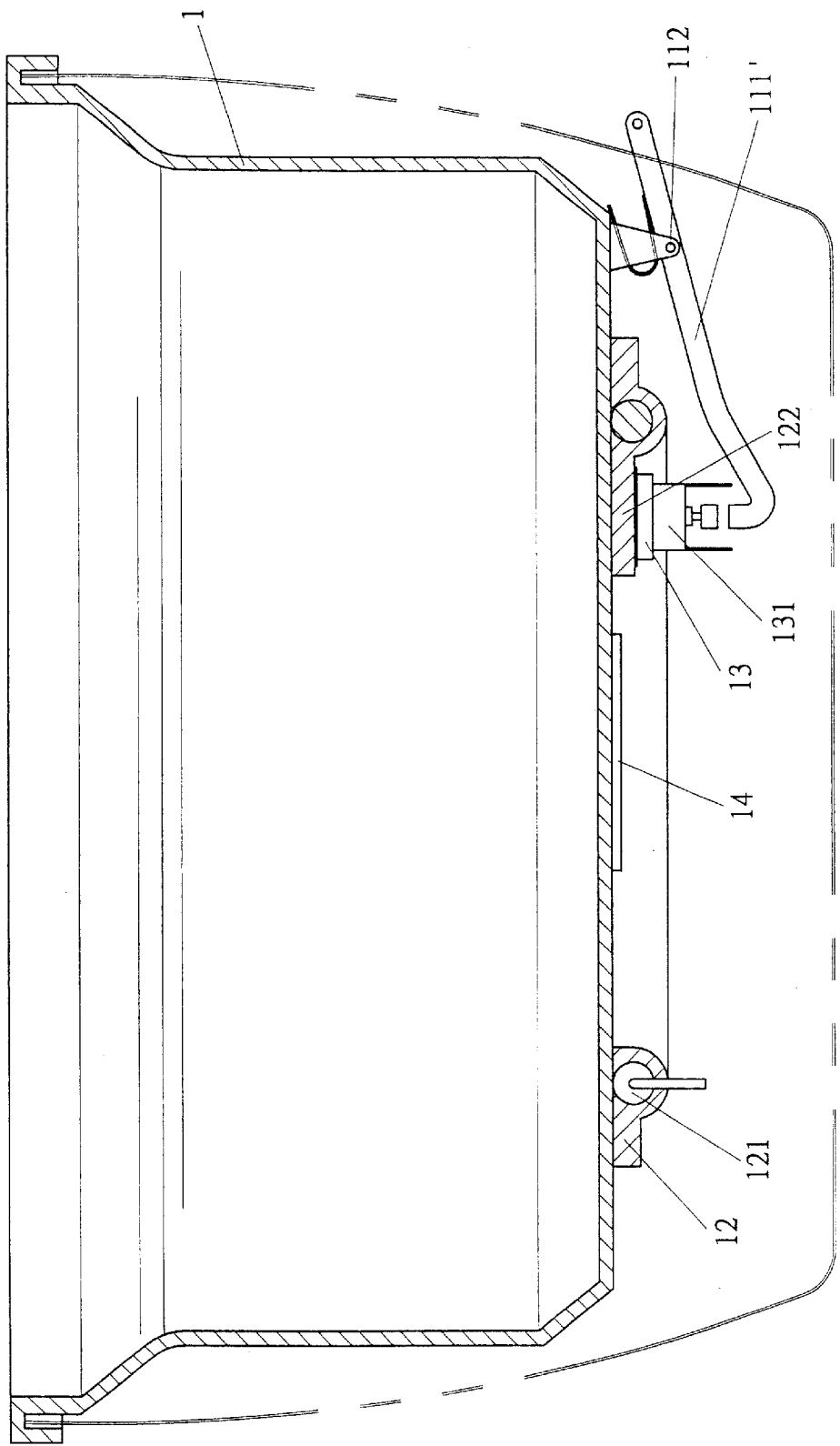
FIG. 4 is a sectional view of the combination in FIG. 2.
Figure 5:
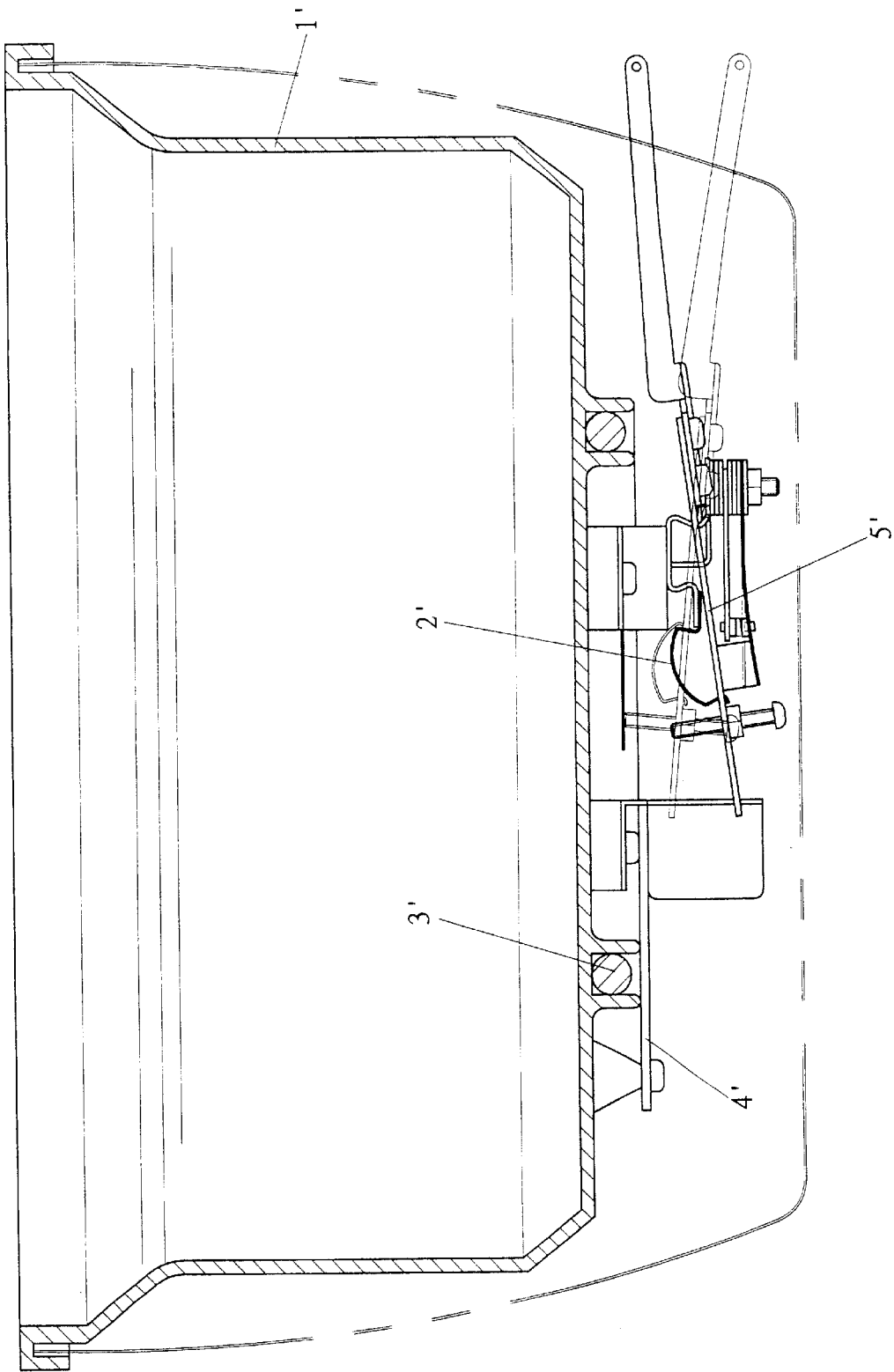
FIG. 5 is a sectional view of a conventional electric rice cooker.

FIGS. 2 and 4 illustrate a modified embodiment of the invention, wherein the mounting plate 122 lies in a horizontal plane for mounting the temperature-control switch 13. The activating member (now designated by 111') is in the form of a lever that has a fulcrum at 112. Thus, the user may manually operate an exposed end of the lever 111' to activate the switch 131 of the temperature-control switch 13 to thereby initiate the cooking procedure.

According to the above description, it is appreciated that the structure of the present invention can be easily and quickly assembled and the electric heating member can be engaged with a sanitary material other than that of the electric heating member.

Although the invention has been explained in relation to its preferred embodiment, it is to be understood that many other possible modifications and variations can be made without departing from the scope of the invention as hereinafter claimed.

What is claimed is:

1. A combination of a bottom of a pan and a heating means, comprising:

a pan comprising a bottom;

an aluminum alloy plate and an electric heating member welded to the bottom of the pan by means of instantaneous welding;

a thermostatic circuit fixed to the bottom of the pan for keeping the pan at a constant temperature when energized;

a mounting plate integrally formed with the aluminum alloy plate;

a temperature-control switch fixed to the mounting plate, a switch being mounted to a rear of the temperature-control switch to thereby switch the temperature-control switch between the electric heating member and the thermostatic circuit; and an activating member operably connected to the switch in a manner that the electric heating member is turned on when the activating member is manually activated and that the electric heating member is turned off and the thermostatic circuit is energized when a food in the pan is well cooked or heated to a predetermined temperature.

2. The combination of a bottom of a pan and a heating means as claimed in claim 1, wherein the mounting plate extends along a horizontal plane, and wherein the activating member is a push button.

3. The combination of a bottom of a pan and a heating means as claimed in claim 1, wherein the mounting plate extends along a plane orthogonal to the bottom of the pan, and wherein the activating member is a lever.

* * * * *